Sept. 28, 1971        C. ROSS        3,608,229

FISHING BOBBER FOR VARIABLE DEPTH FISHING

Filed April 21, 1969        2 Sheets-Sheet 1

CECIL J. ROSS,
*INVENTOR*

BY *Marion E. Shafer,*
ATTORNEY

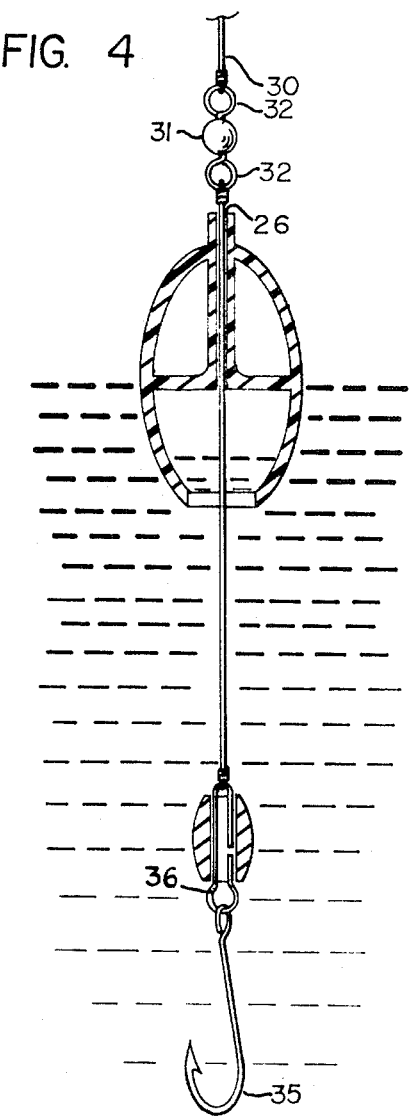
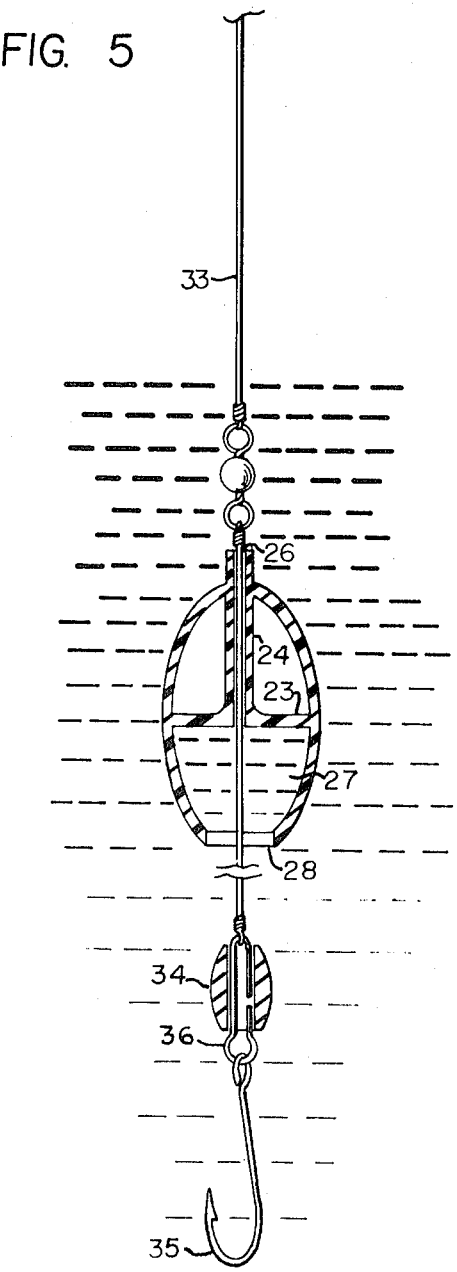

United States Patent Office 3,608,229
Patented Sept. 28, 1971

3,608,229
FISHING BOBBER FOR VARIABLE DEPTH FISHING
Cecil Ross, 3206 Locke Lane, Austin, Tex. 78704
Filed Apr. 21, 1969, Ser. No. 817,895
Int. Cl. A01k 93/00, 95/00
U.S. Cl. 43—43.14                                1 Claim

ABSTRACT OF THE DISCLOSURE

An improved fishing bobber adapted for fishing over a variable range of depth, having one sealed air tight compartment providing flotation capability to support a fish hook and sinker at a shallow depth. A second chamber having an opening therein gradually fills with water so that with the weight of the sinker the bobber will slowly sink through a range of depth, thereby permitting the fisherman to fish for a variety of fish at different levels with a single cast of the line.

SUBJECT MATTER OF THE INVENTION

This invention relates to fishing equipment and more particularly relates to a special fishing bobber adapted to be used in connection with a fishing line and to support the fishing line and associated fishing hook in a manner that will permit the fish hook to gradually sink through a variable range of depth.

PRIOR ART

The basic concept of a simple fishing float tied into the fisherman's line at an intermediate point between the fish hook and the fishing pole for the purpose of limiting the depth to which the fish hook could sink and for indicating to the fisherman when a fish had seized the hook has probably existed since prehistoric times. A variety of innovations have been proposed for fancy and complicated fishing floats and fishing bobbers as well as for improved and fancy fish hooks and fishing lures. Fishermen have literally vied for proliferating the wide range of fishing lures which are believed by the practitioners of the fine art of fishing to have special appeal to various kinds of fish; but fishermen have seldom become enthusiastic over any of the proposed innovations in fishing floats and fishing bobbers. Some of the more recent proposals for improved fishing bobbers in patent art provide for devices for repositioning the fishing float at various points on the fisherman's line to permit the fisherman to control and limit the depth to which the hook will sink but these sink to a single predetermined depth. Other proposed float innovations contain spools with associated mechanisms which permit a predetermined amount of fishing line to be played out after the line is cast into the water but mechanically-controlled spools are notoriously temperamental in operation after they get wet. And one proposal calls for hollow plastic cups attached to the fishing line which gradually sink the fish hook to the desired depth. Between the problems of cost and mechanical complexity, however, very few of the proposals for innovations in float structure have found their way into the commercial market.

Under the circumstances, one of the fisherman's problem needs remains unprovided for. In many of the more attractive fishing areas certain schools of fish will swim at one level, other schools of fish will swim at a second deeper level, and still other types of fish will consistently hug the bottom and not approach the surface of the water. If a fish strikes a sinking hook before the hook has sunk far enough to pull all of the slack out of the line between the hook and the float the action of the fish will produce indecisive signals on the float or bobber and the fisherman will have difficulty in sinking his fish hook when there is slack in the line. It is, therefore, very desirable for the fisherman to use a weight fairly close to his fish hook so that the fish hook decends fairly promptly to the level in which the fisherman desires to fish thereby promptly eliminating any slack in the fishing line between the fish hook and the bobber or float. The fisherman may in a variety of ways and with the aid of the prior art devices described above predetermine the level to which he wishes his fish hook to go but on each recasting the line will promptly decend to this predetermined level so that the fisherman fishes at this level for a particular cast but not above that level or below that level without having again to change the predetermined settings that control the depth to which his fish hook will promptly descend. For all practical purposes this restricts the fisherman to fishing at one particular level at a time. It would be much more convenient, however, if the fisherman could be provided with a means by which his fish hook could gradually sink through a variable range of depth so that at a single casting he is able to fish for a variety of fish at a plurality of levels without developing or permitting slack to develop in his fishing line as the fish hook slowly sinks.

OBJECTS OF THE INVENTION

It is, therefore, a primary object of this invention to provide a specially constructed bobber which will permit the fisherman's hook to sink through a variable range of depths and thereby permit him to fish at a plurality of levels without developing slack in the fishing line.

An object of this invention is to provide a new and improved fishing bobber that will have no mechanical or moving parts to corrode or jam.

Another object of this invention is to provide such an improvement fishing bobber that is so simple in construction that it can be attached and removed from the fishing line without special tools or special skill or knowledge.

A further object of the invention is to devise an improved fishing bobber of such simplicity of construction that it will be inexpensive to manufacture while preserving a sufficiently conventional external and overall appearance as to avoid fishermen's mental block and prejudices against gadget innovations in fishing floats.

Other objects and advantages of this invention will become apparent through consideration of the following description and appended claim in conjunction with the attached drawings in which:

DESCRIPTION OF THE SEVERAL VIEWS IN THE DRAWINGS

FIG. 4 is a sectional view of the variable depth fishing bobber still floating at the surface of the water and partially filling with some water as the fishhook and associated sinker descend to the maximum depth permitted by the length of the sinker feed line.

FIG. 5 is a sectional view of the proposed variable depth fishing bobber showing the lower chamber of said bobber completely filled with water so that both the fishhook and the bobber slowly sink through the water to greater depth.

In describing the preferred embodiment of the invention illustrated in the accompanying drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION OF PREFERRED EMBODIMENT OF INVENTION

Figure 1:
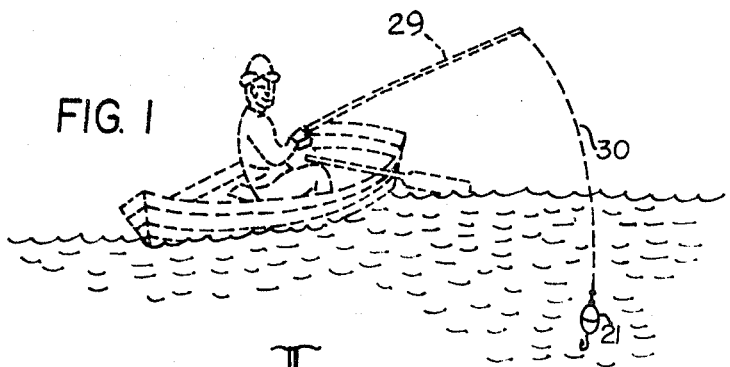
FIG. 1 is a perspective view of a fisherman fishing with a variable depth bobber of the type described herein.

Referring to the specific embodiment of the invention selected for illustration in the accompanying drawings, the improved fishing bobber described herein is designated generally for the overall bobber by the number 21 with a perspective view of the bobber device per se being illustrated in FIG. 1 of the drawings. If fairly conventional appearance is to be perserved the bobber should be fabricated from a convenient plastic material with a shell 22 which creates a generally egg-shaped plastic exterior appearance and defines an interior cavity. Said interior cavity is bisected by partition divider 23 which creates an upper flotation chamber 25 and a lower chamber 27 within said egg-shaped bobber device.

Figure 2:
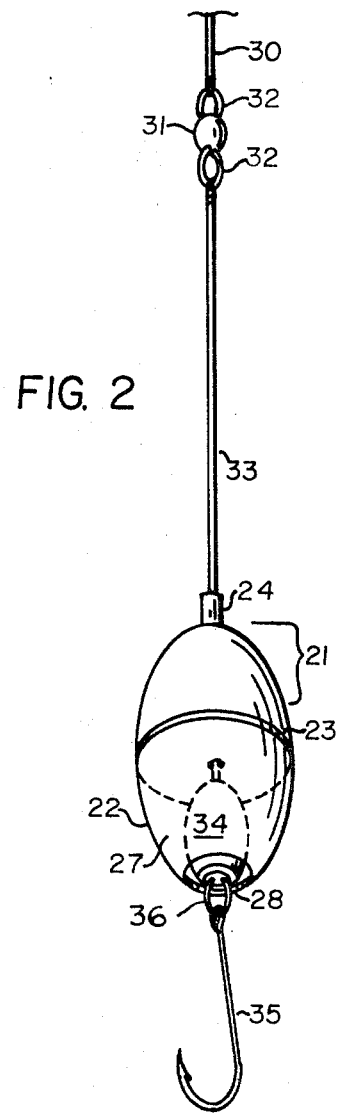
FIG. 2 is a perspective view of the exterior shell of said fishing bobber with parts of the interior construction indicated by dashed lines.

A somewhat better conception of the interior construction of bobber 21 may be gained by examining the cross-section view of said bobber as shown in FIG. 2 of the drawings herein. Line passage tube 24 rises from the floor of divider partition 23, extends upward through flotation chamber 25 and opens to the outside at the top or upper end of bobber 21. The interior tubular cavity 26 of line passage tube 24 extends through divider partition 23 to open into lower chamber 27 of bobber 21. Line passage tube 24 is either fabricated into divider partition 23 or is fused or secured into position in or against divider partition 23 in such a manner as to make a water-tight seal between line passage tube 24 and said divider partition 23. A similar water-tight seal must be made where line passage tube 24 passes through the upper portion of bobber shell 22 so that flotation chamber 25 is sealed against the entry of water. The volume or space of flotation chamber 25 may be filled with any suitable flotation material as desired by the manufacturer but in most instances merely the air sealed into flotation chamber 25 will be sufficient to provide all of the flotation capability needed or desired.

Lower bobber chamber 27 is generally defined by the interior walls of bobber shell 22 and will ordinarily be roughly symmetrical with the upper half of said egg-shaped bobber shell except that at the very bottom of lower chamber 27 there is provided an opening 28 in bobber shell wall 22 such that water can flow from the outside into said lower bobber chamber 27 or out of said chamber. The upper and lower openings of line passage tube 24 and the outside opening 28 of lower bobber chamber 27 should all be in alignment such that a fishing line can be passed through line pasasge tube 24 and extended directly on through lower bobber chamber 27 and out through outside opening 28 without having to make any bends in the line.

As previously explained, variable depth fishing bobber 21 is designed to be used in conjunction with a conventional fishing pole or fishing device 29 and a conventional fishing line 30 attached to said fishing pole by whatever means the fisherman finds convenient. The device described herein is connected to the conventional portion of the fishing line by means of stop means 31 which is provided with eye hooks 32—32 at each end thereof which permits said stop means 31 to be used as both a stop means and a double-ended union connector. The end of the conventional fishing line 30 is threaded through and tied to one of said eye hooks 32. The other end of stop means 31 and associated eye hook 32 are connected to a length of non-wetting fishing line 33 which passes through special variable depth fishing bobber 21 to be connected to one end of sinker weight 34. The other end of said sinker weight 34 is provided with a hook eye 36 for attaching further fishing apparatus which is in turn connected to a fishhook 35 or equivalent item of fishing tackle. The fisherman may desire to employ an intermediate length of fishing line between sinker 34 and fish hook or fishing tackle 35, but the addition or absence of such an intermediate length of line between sinker weight 34 and fish hook or fishing tackle 35 is not a matter of vital concern in this invention and the employment of such intermediate length of fishing line is left to the discretion and choice of the individual fisherman using the device.

The interior opening of line passage tube 24 should be sufficiently large to permit the length of fishing line 33 to pass through said opening smoothly without developing material friction or obstruction. Some wetting of the interior walls of line passage tube 24 will necessarily occur and a small amount of friction will be of assistance in slowing the rate at which line 33 flows through special variable depth bobber 21 but the line should never be allowed to bind. The avoidance of line 33 binding in the course of passing through the interior of line passage tube 24 in bobber 21 will be facilitated by employing a plastic, nylon or other non-wetting form of fishing line for length of fishing line 33.

Sinker weight 34 connected to the lower end of said length of fishing line 33 should be of sufficient size to occupy at least half of lower opening 28 in bobber shell 21 when sinker weight 34 is pulled into the lower cavity of said bobber 21. The inventor anticipates the manufacture of bobbers 21 as an independent item of fishing merchandise or hardware with each fisherman free to devise his own selection of length of line 33 and choice of sinker weight 34 and fishhook 35 or associated fishing tackle but there is sufficient need for careful selection of the relationship and size of sinker 31 to lower opening 28 in bobber shell 21 and the flotation capacity of upper flotation chamber 25 that the manufacturer may prefer to factory-assemble stop means 31, length of line 33, variable depth bobber 21, and sinker weight 34 as a factory assembled package. This arrangement, of course, improves the reliability of having said device work in accordance with the contemplation of this invention.

OPERATION

Figure 3:
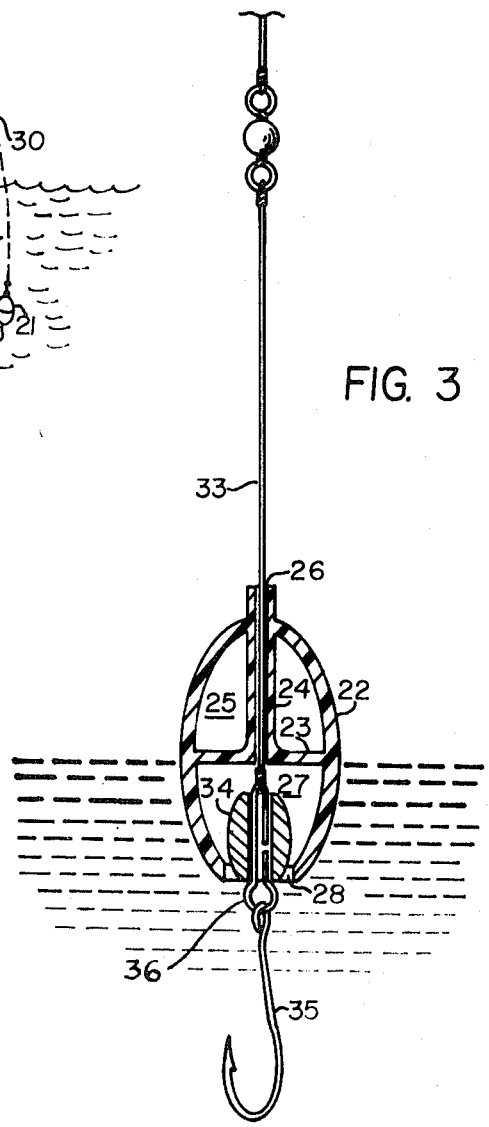
FIG. 3 is a sectional view of said fishing bobber showing the arrangement of the interior compartment of the bobber and showing the fish line weight in the mouth opening of the lower chamber of said bobber as said parts would be positioned when the bobber had been newly cast on the surface of the water.

When a fisherman desires to fish over a variable depth range employing special fishing bobber 21 he will remove the regular sinker and fishhook or fishing tackle from his line and substitute the apparatus described herein. To his fishing pole 29 and regular fishing line 30 he will attach stop means 31 which, as previously described, is attached to special non-wetting line 33 on which slidably rides variable depth fishing bobber 21 with special fishing line 33 connecting at its lower end to the upper end of sinker weight 34. The lower end of sinker weight 34 is provided with an appropriate hook eye 36 which provides a means for attaching fishhook 35 or other fishing tackle of the fisherman's choice. With the fishing line suspended in air lifted out of the water variable depth fishing bobber 21 will slide down line 33 until sinker weight 34 comes to rest inside the lower chamber 27 of bobber 21 as shown in FIGS. 2 and 3 of the drawings herein. When the fisherman casts said device and such fishhook or fishing tackle as he may have attached to lower hook eye 36 on sinker weight 34 into the water, the combined air in flotation chamber 25 and lower chamber 27 will maintain bobber 21 afloat on the surface of the water as shown in FIG. 3 of the drawings. The combined weight of fishhook 35 or other appropriate fishing tackle and sinker weight 34 will gradually pull sinker weight 34 out of the lower cavity of fishing bobber 21 and said fishhook 34 will begin to descend into the water at such rate as is permitted by the rate at which special length of fishing line 33 can slide through the interior cavity 26 of line passage tube 24. This descent will continue until stop means 31 comes to rest at the top of line passage tube 24 as shown in FIG. 4 of the drawings. As sinker weight 34 passed out of lower chamber 27 some quantity of water will have flowed into said lower chamber 27 to replace the space formerly occupied by sinker weight 34 with the result that bobber 21 will sink to a slightly lower depth in the water. More water cannot flow into lower chamber 27, however, until some of the residual air trapped in said lower chamber finds a means of escape. There are two possible means of escape. Very small amounts of air may trickle upward through the interior cavity 26 in line passage tube 24 and some air will escape through lower opening 28 at the bottom of lower chamber 27 when bobber 21 is tilted or jiggled by the action of waves on the water on which bobber 21 is riding or by small movement of fishing pole 29. Each time the bobber is tilted or jiggled, air escapes from lower chamber 27 bobber 21 will sink slightly deeper into the water. Eventually all of the air will be exhausted out of lower chamber 27 and at this time the combined weight of fishhook 35, sinker weight 34, and the water now in lower cavity 27 will slightly overbalance the flotation capacity of upper flotation chamber 25 with the result that bobber 21 will slowly sink through the water until it reaches the bottom or until it reaches the depth permitted by the combined length of fishing line 33 and fishing line 30 as shown in FIG. 5 of the drawings. By this action the fisherman will be enabled to fish over a variable range of depth levels as previously described.

When fish hook 35 reaches bottom or the maximum depth permitted by the fisherman's line, the fisherman pulls his line out of the water. The water in lower chamber 27 will empty out as bobber 21 is lifted into the air and said bobber 21 will slide down line 33 until sinker weight 34 is again housed inside lower chamber 27 of bobber 21 as shown in FIGS. 2 and 3 of the drawings. Said fishing line and bobber 21 are then ready to be recast into the water for another try.

ADVANTAGES

In the foregoing description of the structure and operation of the invention set forth herein, a number of advantages have been claimed for the apparatus and others will be readily apparent to persons skilled in the art. An advantage of the bobber structure proposed herein is that it is of such simple construction that it will be inexpensive to manufacture and looks sufficiently like a conventional fishing float or bobber that it will invoke little sales resistance from the purchasers of conventional fishing gear.

Another advantage of providing a variable depth fishing bobber of such extreme simplicity of construction is that it can be attached and removed from the fishing line without special tools or special skill or knowledge.

A further advantage of this invention is that it has no mechanical or moving parts to corrode or jam.

The primary advantage of the invention, however, is that it will permit the fisherman's hook or fishing lure to gradually sink through a variable range of depth thereby permitting the fisherman to fish for fish that restrict themselves to particular levels in the water.

Although this specification describes but a single embodiment of the invention with certain applications thereof, it should be understood that structural or material rearrangements of adequate or equivalent parts, substitutions of equivalent functional elements and other modifications in structure can be made and other applications devised without departing from the spirit and scope of my invention. I, therefore, desire that the description and the drawings herein be regarded as only an illustration of my invention and that the invention be regarded as limited only as set forth in the following claim, or as required by the prior art.

Having thus described my invention, I claim:
1. Improved fishing apparatus to be used in connection with a conventional fishing pole and line for fishing over a variable range of depth, the improved portion of said fishing apparatus comprising:
 (A) a length of fishing line provided with
  (1) upper stop means of attaching one end of said length of fishing line to a conventional fishing line and fishing pole,
  (2) said length of fishing line extending through the length of a plastic bobber, and
  (3) the other end of said length of line being connectable to a lower stop means such as a sinker or weight;
 (B) an egg-shaped plastic bobber shell defining an interior cavity, and said plastic bobber shell having
  (1) a partition dividing the upper and lower parts of the bobber shell cavity into separate chambers with an upper flotation chamber; with
  (2) the upper flotation chamber being sealed and provided with a volume of flotation material such as air and of just sufficient flotation capacity to barely keep said bobber afloat when first cast into the water with no water in the lower chamber; and
  (3) the lower chamber provided with an outside opening through which water can slowly flow into said lower chamber with said lower chamber having sufficient water-receiving capacity which with the weight of the sinker will operate to override the flotation capacity of the upper chamber and to cause the bobber to sink as the lower chamber becomes filled with water;
  (4) a line-passage tube extending through the upper flotation chamber, with
   (a) the lower end of said line-passage tube provided with an opening into the lower chamber and
   (b) the upper end of said line-passage tube extending through the top of the bobber shell and provided with an opening to the outside; with
  (5) said upper and lower openings of the line-passage tube and the outside opening of the lower chamber all being in alignment and said bobber being slidably mounted on said length of fishing line;
 (C) a sinker weight connected to the lower end of said length of fishing line and being of sufficient size to occupy at least half of the lower opening in said bobber shell and to partially close said outside opening to the lower chamber of said bobber and thereby obstruct the flow of water into said lower chamber as long as the sinker weight is in said opening; and
 (D) a fishhook connected to the lower end of said sinker weight.

References Cited

UNITED STATES PATENTS

| | | | |
|---|---|---|---|
| 2,498,815 | 2/1950 | McVay | 43—44.9X |
| 2,669,054 | 2/1954 | Smith | 43—44.9X |
| 2,741,864 | 4/1956 | Shotton | 43—44.9 |

SAMUEL KOREN, Primary Examiner
D. J. LEACH, Assistant Examiner

U.S. Cl. X.R.
43—43.15, 44.9